United States Patent [19]

Onoda

[11] Patent Number: 4,745,725

[45] Date of Patent: May 24, 1988

[54] DEPLOYABLE TRUSS STRUCTURE

[75] Inventor: Junjiroh Onoda, Tokyo, Japan

[73] Assignee: Japan Aircraft Mfg. Co., Ltd., Yokohama, Japan; a part interest

[21] Appl. No.: 730,351

[22] Filed: May 3, 1985

[30] Foreign Application Priority Data

May 7, 1984 [JP] Japan ................................. 59-90442

[51] Int. Cl.$^4$ ........................................... E04H 12/14
[52] U.S. Cl. ....................................... 52/646; 52/648; 52/655
[58] Field of Search ................. 52/632, 648, 655, 654, 52/108, 646

[56] References Cited

U.S. PATENT DOCUMENTS 4,655,022  4/1987  Natori ............................... 52/108 X

FOREIGN PATENT DOCUMENTS 1116832  5/1956  France ................................. 52/648
2530  of 1887  United Kingdom .................. 52/632
605916  4/1978  U.S.S.R. ................................ 52/648

OTHER PUBLICATIONS

Line Material Company, "A Guide to Substation Structure Design", 1954.
Development of Deployable Structure of Large Space Platform Systems (Interim Report vol. I) Aug. 1982, NASA-CR-170689.
"Development of Deployable Structures for Large Space Platform Systems," R. L. Box, et al., NASA--CR-170690, Part I Interim Report, Oct. 29, 1981-Jul. 31, 1982 (Vought Corp., Dallas, Tex.).

Primary Examiner—Carl D. Friedman
Attorney, Agent, or Firm—Frishauf, Holtz, Goodman & Woodward

[57] ABSTRACT

A truss structure for use in outer space comprises a plurality of module units and can be deployed into a structure having a flat surface or a curved surface. Each module unit comprises members, two pairs of flexible chords and four diagonal members. The members are arranged along the edges of an imaginary rectangular parallelepiped. The flexible chords of the first pair are stretched in that face of the imaginary parallelepiped which defines the flat or curved face, along the diagonals of this face. The flexible chords of the second pair are stretched in that face of the imaginary parallelepiped which opposes said face, along the diagonals of this face. Each diagonal member is provided in the corresponding one of the other four faces of the imaginary parallelepiped, along one diagonal of this face, extending at right angles to the diagonal member provided in the opposite parallel face. As the diagonal members are elongated, the module unit is folded, thus slackening the chords and positioning the members and diagonal members substantially parallel to one another. As the diagonal members are contracted, the module unit is deployed.

4 Claims, 9 Drawing Sheets

F I G. 4C
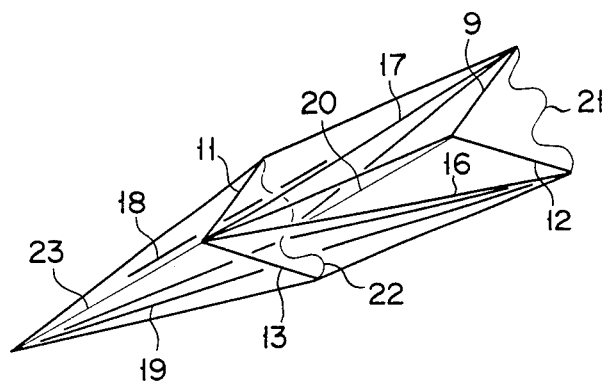
F I G. 4D
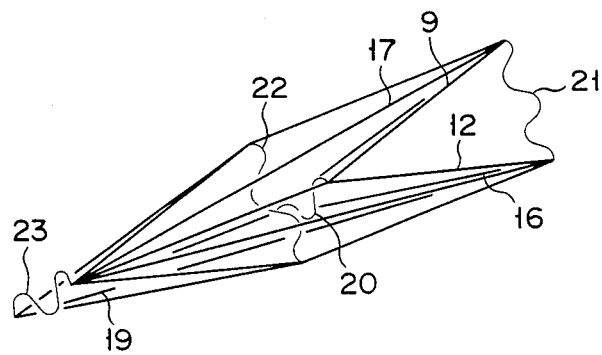

DEPLOYABLE TRUSS STRUCTURE

BACKGROUND OF THE INVENTION

Field of the Invention

The present invention relates to a truss structure which can be stowed within a small space in the folded condition and can be deployed in one or two directions and, more particularly, to a deployable truss structure which can easily be deployed in outer space and can take various shapes in the deployed condition.

The truss structure according to the invention is designed as a medium-sized or large space building such as a space colony, a solar power generating satellite, a huge antenna or a space station. It may also be used as a transportable, makeshift building on the ground.

The components of a space building are boosted into outer space from the earth. Hence, they must meet the following requirements:

(1) As light as possible
(2) Small enough to be stowed in a spacevehicle
(3) Small in the folded condition
(4) Easy to assemble into a building
(5) Rigid in the deployed condition.

Truss structures are the most promising for a large space building. A so-called nestable column is one type of truss structure. To assemble nestable columns into a building in outer space is not easy. Robot may be used to assemble such a building. If robots are employed for this purpose, at least one astronaut must supervise them, endangering himself. Hence, a demand has been made for a truss structure which is automatically or semiautomatically deployable in outer space though it cannot be packaged very tightly. To meet this demand, various truss structures have been invented which can be deployed in one direction. One of them is "Astromast (tradename)" disclosed in Japanese Patent Publication Sho No. 49-26653 and in U.S. Pat. No. 3,486,279. Truss structures deployable in two directions are still in their embryonic stage.

Despite the great demand, there are no practial truss structures deployable in two directions. It is more greatly demanded that a two-dimensionally deployable structure be packaged small than it is desired that a truss structure depoyable in one direction be small. Further, the one-dimensionally deployable structures available at present cannot be stowed within a small space.

The one-dimensional truss structures are divided into two types. The first type comprises rigid members and joints connecting trusses. The second type comprises flexible, foldable members and no joints. Both types have their own drawbacks. The members of the first type have but insufficient buckling strength. The second type is not so rigid as desired.

In space, a parabola antenna deployed in space may have a shape different from the shape it takes when assembled on the ground, since no force of gravity acts on it in outer space. In addition, it may undergo a thermal deformation in outer space. Accordingly, it is desired that its shape can be adjusted in space.

A deployable truss structure has been proposed which comprises members arranged along the edges of an imaginary rectangular parallelepiped and diagonal members arranged in the faces of the parallelepiped. This is relatively rigid, but each diagonal member needs a mechanism which allows it to expand and contract. Due to the use of such mechanisms, it is inevitably complex and relatively heavy. For the same reason, it occupies a relatively large space when folded.

SUMMARY OF THE INVENTION

Accordingly, it is the object of this invention to provide a two-dimensionally deployable truss structure which can be stowed in a small space in the folded condition and comprises members of sufficient rigidity and buckling strength, and whose shape can be easily adjusted in outer space.

According to the present invention, there is provided a deployable truss structure which is shaped like a flat plate or curved plate when deployed, and comprises a plurality of module units, each comprising members arranged along the edges of an imaginary rectangular parallelepiped; two pairs of flexible chords, the chords of the first pair being stretched in that face of the imaginary parallelepiped which is part of one flat or curved surface of the deployed structure, along the diagonals of this face, and the chords of the second pair being stretched in that face of the imaginary parallelepiped which opposes said face; a diagonal member provided in each of the other four faces of the imaginary parallelepiped, along one diagonal of this face, crossing the diagonal member provided in the opposite parallel face, each module unit being jointed to adjacent module units and sharing some of the members with these adjacent module units.

BRIEF DESCRIPTION OF THE DRAWINGS

FIG. 1A is a perspective view of one of the deployed module units of a deployable truss structure according to the present invention having a spring type expansion-contraction mechanism;

FIG. 1B is a perspective view of one of the deployed module units of a deployable truss structure according to the present invention with a motor driven type of expansion contraction mechanism;

FIGS. 4A–4D show how the module unit of FIG. 1 is folded and deployed;

DETAILED DESCRIPTION OF THE PREFERRED EMBODIMENTS

A few embodiments of the present invention will now be described with reference to the drawings attached hereto.

Figure 1:
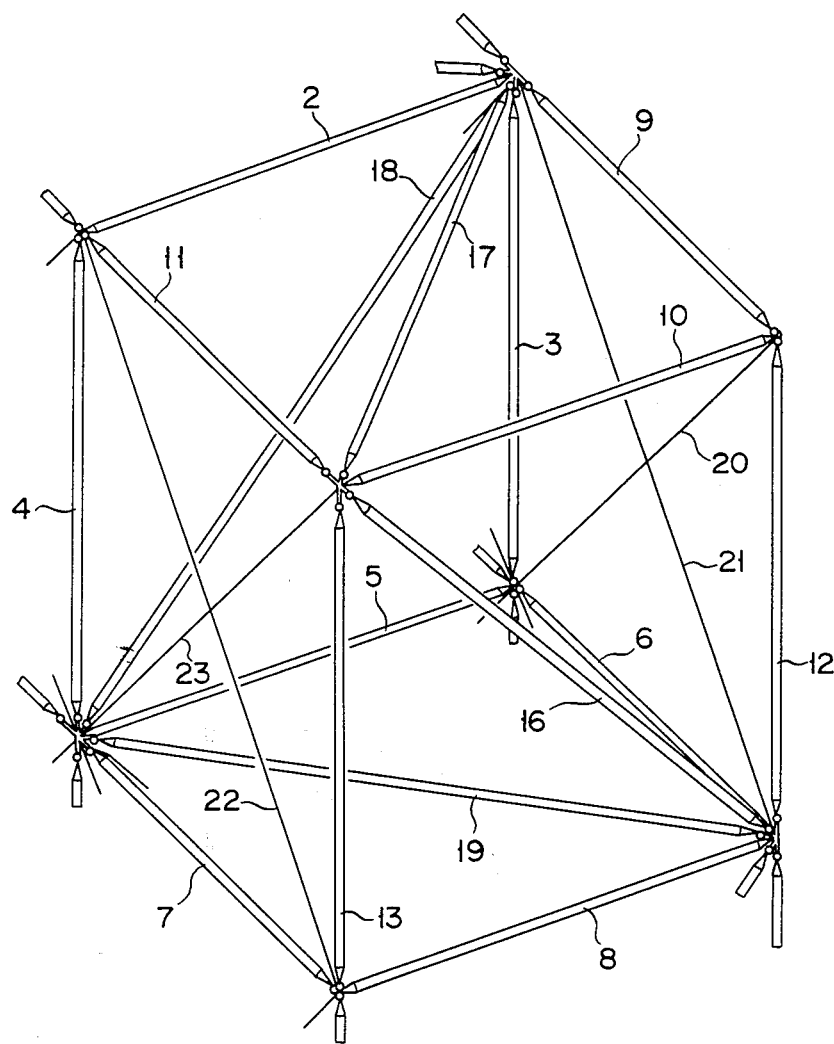
FIG. 1 is folded and deployed, more schematically than FIGS. 4A–4D.

FIG. 1 shows one of the module units forming a deployable truss structure according to the invention, and the portions of the members forming the adjacent module units. Each module unit comprises 12 members 2–13, four chords 20–23 and four diagonal members 16–19. Members 2–13 are arranged along the twelve edges of an imaginary rectangular parallelepiped, each being coupled to two others at the ends by joints. Chords 20 and 21 are stretched along the diagonals of the rectangular face defined by members 3, 6, 9 and 12. Chords 22 and 23 are stretched along the diagonals of the rectangle plane defined by members 4, 7, 11 and 13 which opposes the plane defined by members 3, 6, 9 and 12. The first diagonal member 16 is coupled at the upper end to the joint connecting the members 10, 11 and 13 and at the lower end to the joint connecting members 6, 8 and 12. Similarly, the second diagonal member 17 is coupled at one end to the joint connecting members 2, 3 and 9 and at the other end to the joint connecting members 10, 11 and 13. The third diagonal member 18 is connected at the upper end to the joint connecting members 2, 3 and 9 and at the lower end to the joint connecting members 4, 5 and 7. The fourth diagonal member 19 is coupled at one end to the joint connecting members 4, 5 and 7 and at the other end to the joint connecting members 6, 8 and 12. Each of diagonal members 16-19 has an expansion-contraction mechanism and can be elongated and contracted. (The diagonal members shown in FIG. 1 are in the most contracted condition.) The mechanisms may be either a spring type mechanism 31 shown in FIG. 1B or a motor-driven type mechanism 32 shown in FIG. 1A. The spring type is used when it is sufficient for each diagonal member to take only two conditions, i.e., the contracted condition and the expanded condition. The motor-driven type, which can be controlled by a suitable circuit, is employed when each diagonal member must extend or contract to different degrees.

Figure 2:
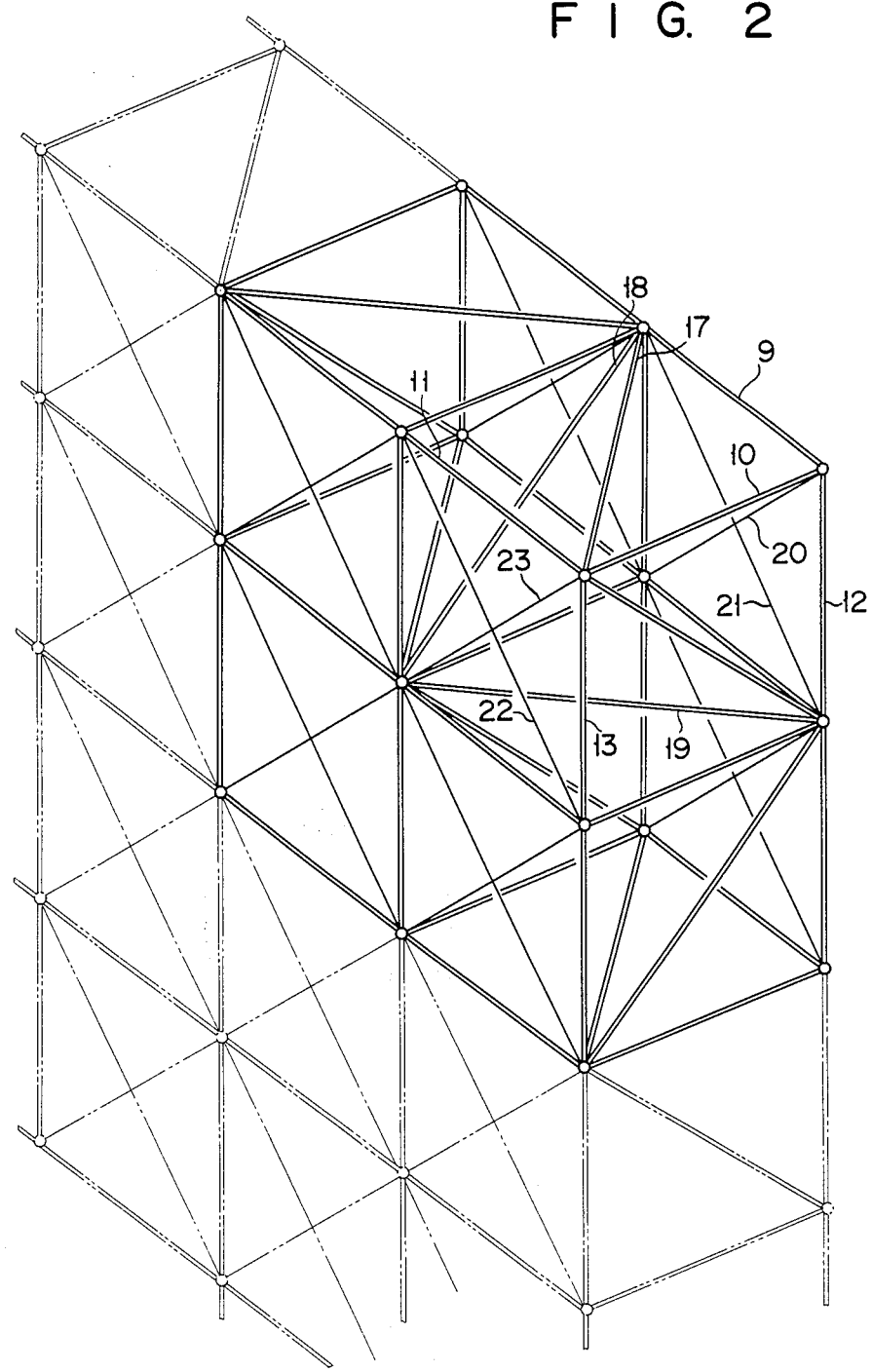
FIG. 2 is a perspective view of a deployed truss structure of the invention, showing how module units are assembled.
Figure 3:
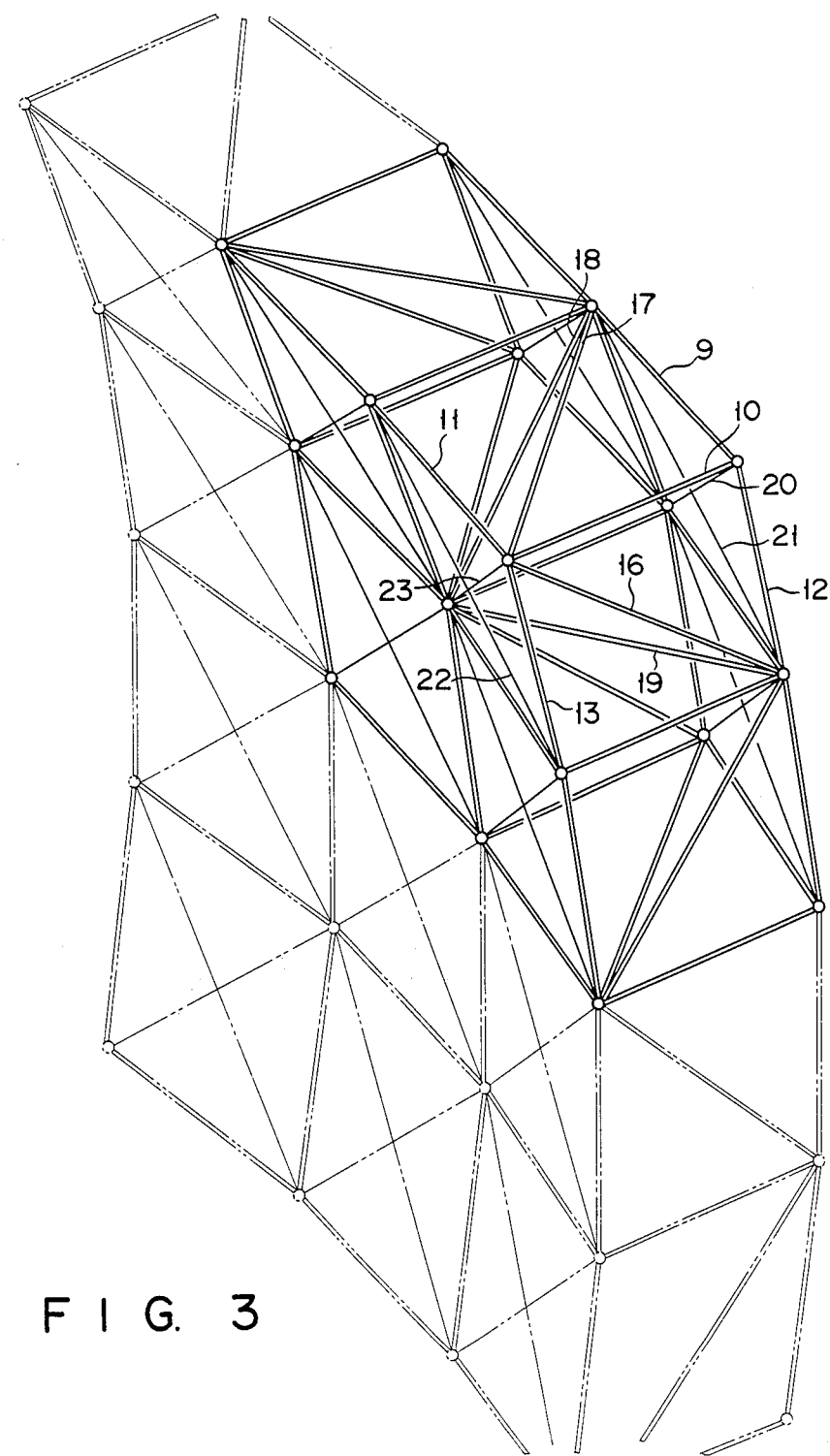
FIG. 3 is a perspective view of the truss structure taking a different shape.

The truss structure in the deployed condition can take various shapes. FIGS. 2 and 3 show two of the shapes the structure can have. As shown in FIG. 2, any two adjacent module units are coupled such that they share four members defining one rectangle, one diagonal member extending between the two corners of this rectangle. When the diagonal members of each module unit are provided with motor-driven expansion-contraction mechanisms and are elongated to different degrees, the shape of the truss structure changes to another shown in FIG. 3. Macroscopically speaking, the structure is curved. As shown in FIG. 3, those planes defined by two sets of members (each consisting of four) of each module unit, in which two pairs of chords are stretched, are parts of the curved surfaces of the structure.

It will now be described how each module unit of the truss structure shown in FIG. 2 is folded, with reference to FIGS. 4A-4D wherein the members are shown by thick lines and the chords are represented by thin lines and curves.

Figure 4A:
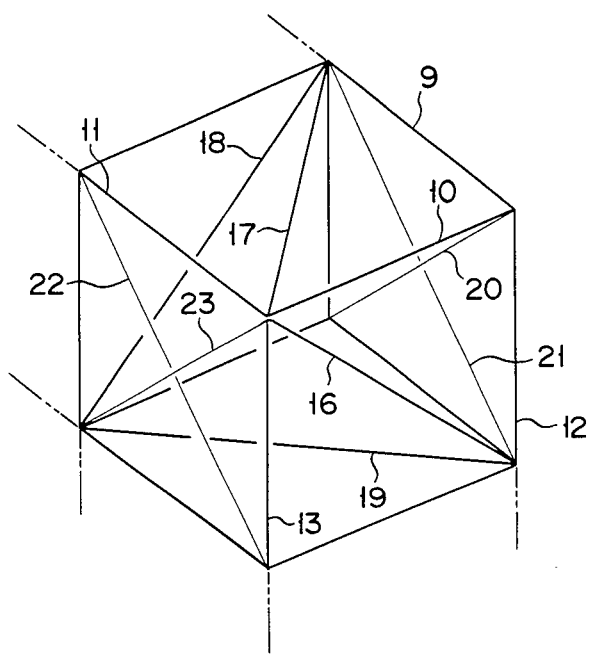
Figure 6:
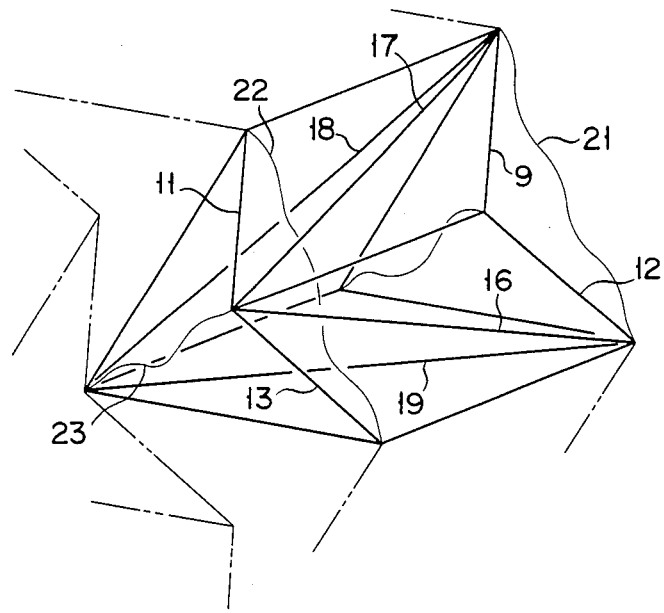
FIG. 6 is a perspective view of the module unit of FIG. 1 being folded.
Figure 7:
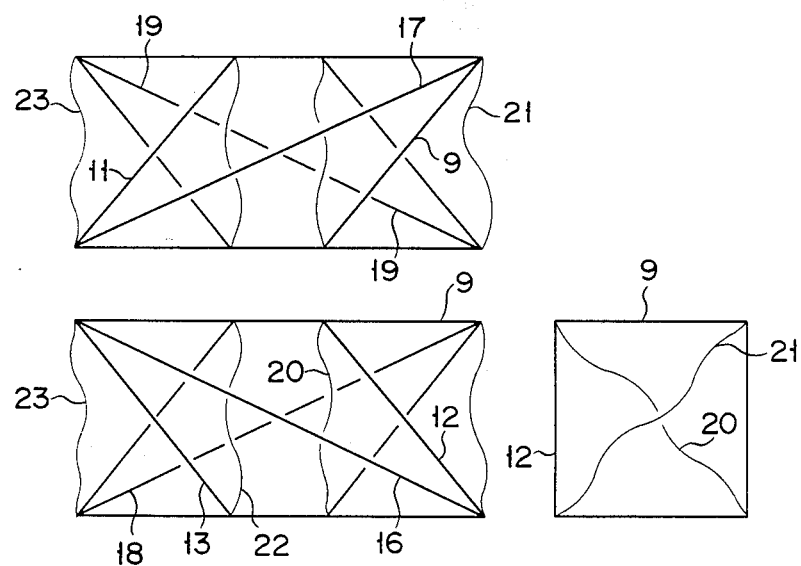
FIG. 7 shows three views of the module unit in the condition shown in FIG. 6.

FIG. 4A is a perspective view of one of the module units. FIG. 5A shows three views of the same. As the diagonal members 16-19 are elongated, the module unit takes the shape shown in FIG. 4B and FIG. 5B (three views) and then the shape shown in FIG. 4C and FIG. 5C (three pieces). At last, it is folded to have the specific shape illustrated in FIG. 4D and FIG. 5D (three views). As shown in FIGS. 4D and 5D, all members are very close to each other and are almost parallel to each other. Hence, the module unit in the folded condition can be stored in a small space. Were the thickness of the members and the size of the joints connecting the members infinitely reduced, the module unit could be folded to be twice as long as each member. FIG. 6 shows the module unit further folded than the condition shown in FIGS. 4B and 5B and less folded than the condition of FIGS. 4C and 5C, and some parts of the adjacent module unit. FIG. 7 shows three views of the module shown in FIG. 6.

Figure 4B:
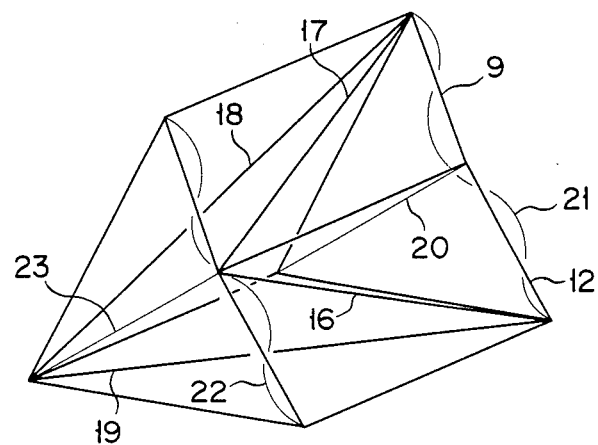
Figure 5A:
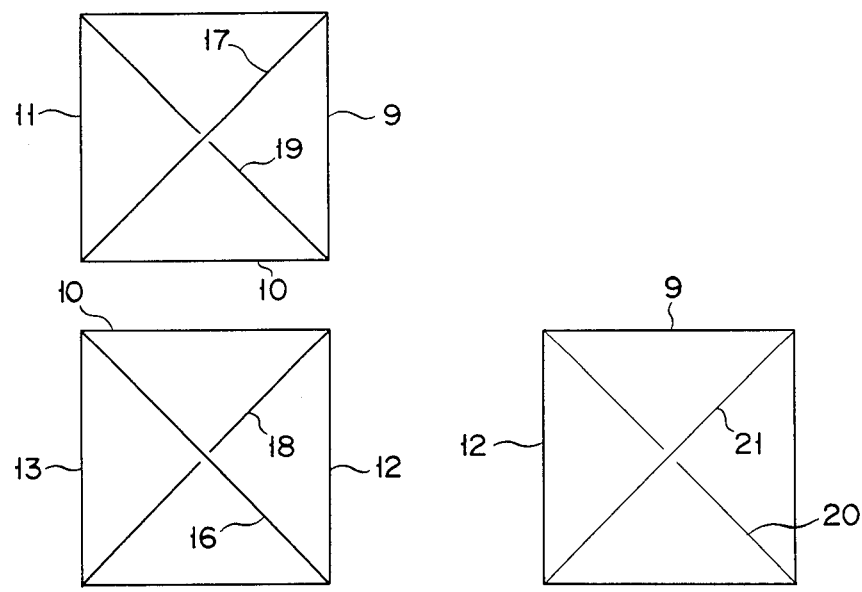
FIGS. 5A–5D illustrate how the module of unit
Figure 5B:
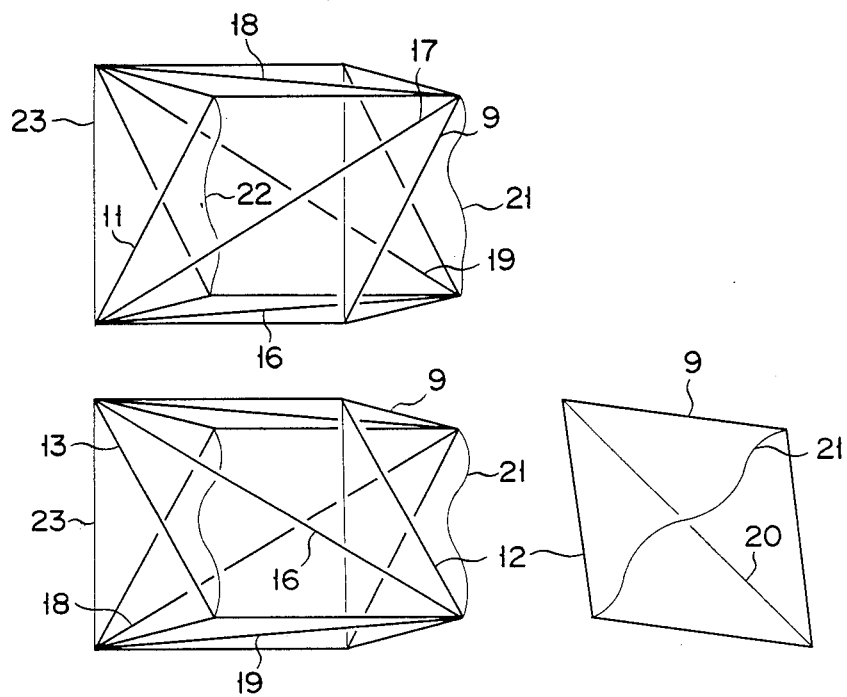
Figure 5C:
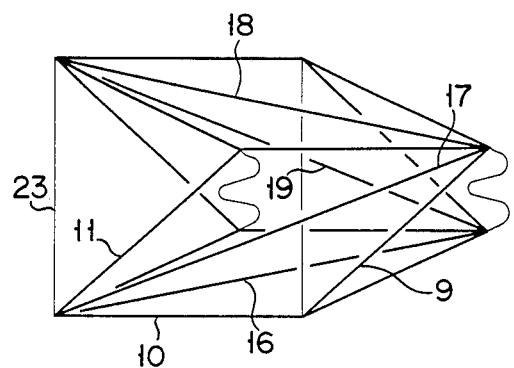
Figure 5C:
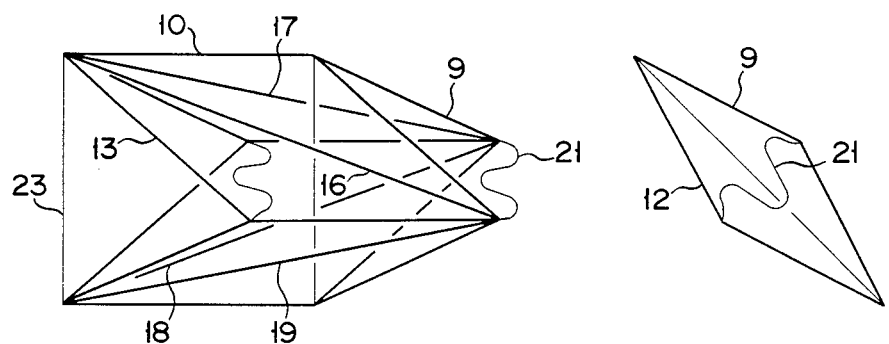
Figure 5D:
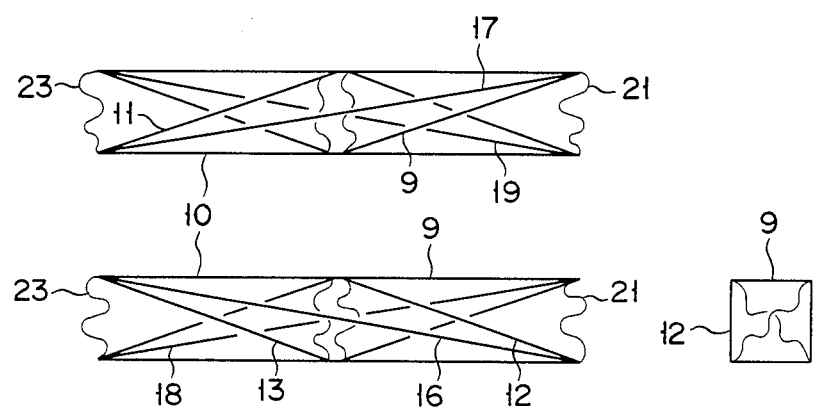

To deploy the module unit, the diagonal members 16-19 are contracted, changing the shape of the folded unit (FIGS. 4D and 5D) to that of FIGS. 4C and 5C, then that of FIGS. 4B and 5B and finally to that (deployed) shown in FIGS. 4A and 5A.

As stated above, the truss structure of FIG. 2 can be changed to the structure of FIG. 3 which has, macroscopically speaking, two curved surfaces. This is done by elongating the diagonal members of each module unit to different degrees. The curvature of the deployed truss structure can be changed to a desired one by controlling the expansion-contraction mechanisms, thus adjusting the lengths of the diagonal members.

The joints (not shown in FIGS. 4A-4D) allow members 2-13 to swing about them. The degree of freedom of each joint and the maximum angle of swing thereof are determined by the use of the deployed truss structure. In view of the required rigidity, the degree of freedom should not be too great. The degree is one in the truss structure shown in FIG. 2.

Neither members 2-13 nor diagonal members 16-19 are folded double at midpoint. Hence, their strength is not reduced as the module unit is repeatedly folded and deployed. They need not be thicker than in the case where they need to be bent double. Hence, the truss structure as a whole is lighter than said case.

This invention is not limited to the truss structure of FIG. 2. All or some of the diagonal members 16-19 of the module unit shown in FIG. 1 may be replaced with pairs of chords, each pair consisting of two chords extending along the diagonals of a rectangle defined by four members. In this case, the module unit is folded or deployed by tightening one chord of each pair and slackening the other. As these chords are tightened and slackened, the structure of FIG. 2 is curved as shown in FIG. 3.

Further, a number of module units of the type shown in FIG. 1 may be coupled to form a truss structure deployable in one direction.

Moreover, some module units of the structure shown in FIG. 2 may be omitted. In this case, too, the whole structure can be folded and deployed as each module unit is folded and deployed. Which module units should be omitted depends upon the use, desired size and required strength of the structure.

A few applications of the invention will be described:
(1) Space platform

The truss structure of FIG. 2 can be used as a space platform on which astronauts may conduct various experiments, observe space or do other kinds of works.

(2) Huge parabola antenna

Figure 8A:
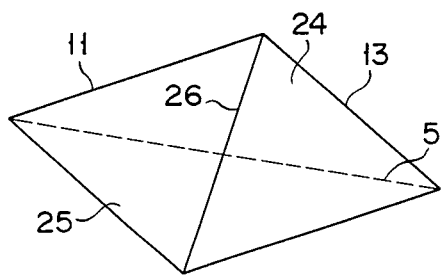
FIGS. 8A–8C illustrate how two triangular reflector layers stretched in one plane defined by the four of the members of each module unit are folded as the module unit is folded.
Figure 8B:
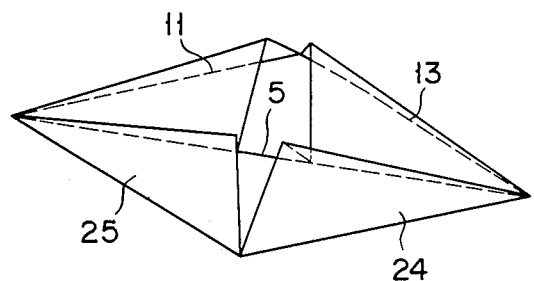
Figure 8C:
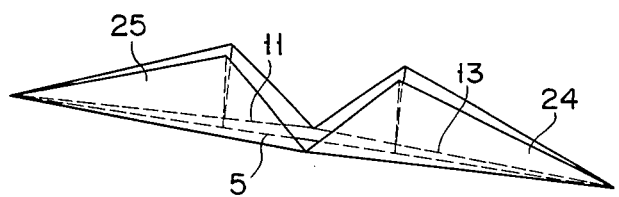

The structure of FIG. 2 can be used as a parabola antenna. The lengths of the diagonal members of each module unit are adjusted such that the truss structure is shaped like a cup. The reflector to be stretched over the concaved surface of the truss structure may be a metal net which can undergo sharing deformation. When a reflector layer unable to undergo sharing deformation is used, it is formed by connecting triangular layers. In this case, two triangular layers are stretched in one plane defined by members 4, 7, 11 and 13 (FIG. 1), as illustrated in FIG. 8A. These triangular layers are folded as shown in FIGS. 8B and 8C as the module unit (FIG. 1) is folded. Since the layers are far thinner than the members, they easily slip into the gaps between the members when the module unit is folded as shown in FIGS. 4D and 5D. Hence, they do not noticeably increase the volume of the folded module unit. Module units of the type shown in FIG. 1 can be combined to form a truss structure deployable in one direction, which can be used to support the power source or the auxiliary reflector of the parabola antenna.

(3) Solar power generating satellite

The structure of FIG. 2 can be used as a solar power generating satellite extending several kilometers long and several kilometers wide. A rectangular panel with solar cells is stretched over one side of each module unit. The power generated by the cells is converted into microwaves, which are transmitted to a ground station. The solar panel consists of two triangular layers. These layers are folded in the same way as the triangular reflector layers (FIGS. 8A–8C), as the module unit is folded.

To assemble a very large solar power generating satellite, a plurality of one-dimensional truss structures may be connected together.

What is claimed is:

1. A deployable truss structure which expands to a structure having two main, opposed flat or curved surfaces when deployed, said truss structure comprising a plurality of module units, each said modules comprising:

members arranged along the edges of an imaginary rectangular parallelepiped;

two flexible chords stretched in each of two opposed faces of the imaginary rectangular parallelpiped which form parts of the main, opposed flat or curved surfaces of the truss structure, along the diagnosis of these faces; and a diagonal member provided along one diagonal in each of the other four faces of the imaginary rectangular parallelepiped, crossing the diagonal member provided in the opposite parallel face, said diagonal member being telescoping, being in an expanded state until the truss structure is deployed, and being contracted when the truss structure is deployed, each module unit being joined to adjacent module units and sharing some of the members with adjacent module units.

2. A deployable truss structure according to claim 1, wherein said diagonal members are elongated by springs.

3. A deployable truss structure according to claim 1, wherein said diagonal members are elongated and contracted by motor-driven actuators.

4. A deployable truss structure according to claim 1, wherein said curved surface is formed by adjusting the lengths of said diagonal members when said module units are in the deployed condition.

* * * * *